C. P. BURT.
SELECTIVE SPEED MECHANISM AND CONTROLLING DEVICE THEREFOR.
APPLICATION FILED JAN. 20, 1914.
1,133,925.
Patented Mar. 30, 1915.
4 SHEETS—SHEET 1.
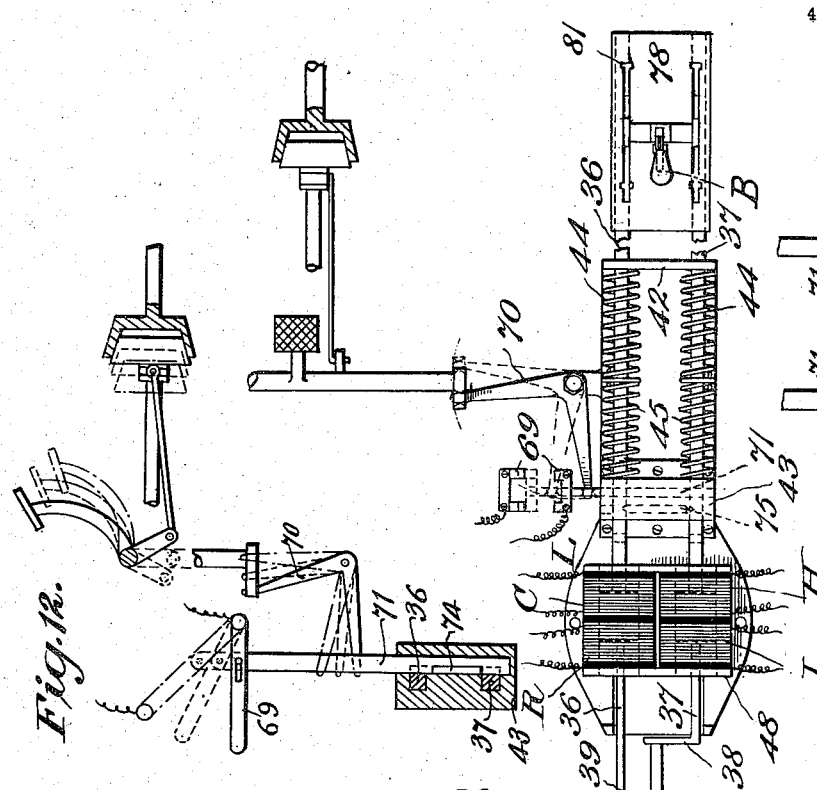
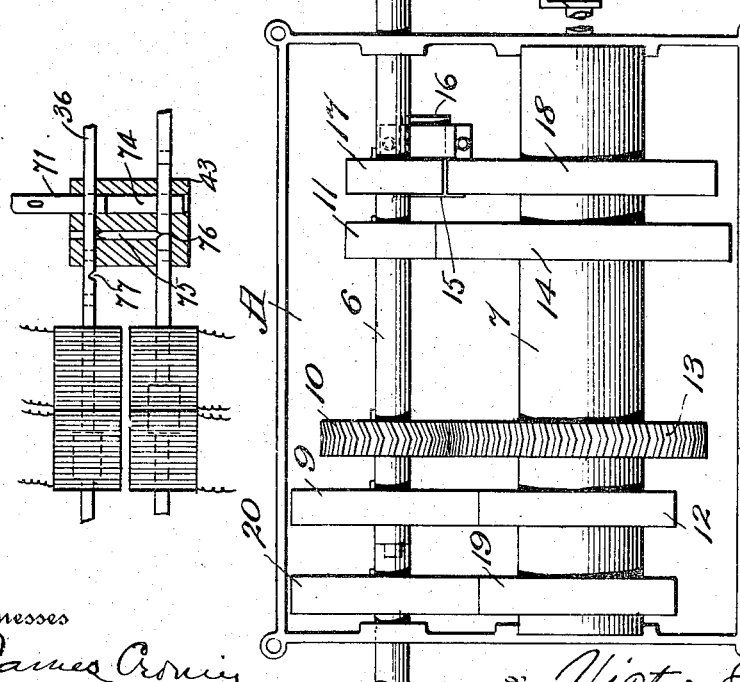
Witnesses
James Cronin
M. E. Laughlin
Inventor
Charles P. Burt,
By Victor J. Evans
Attorney

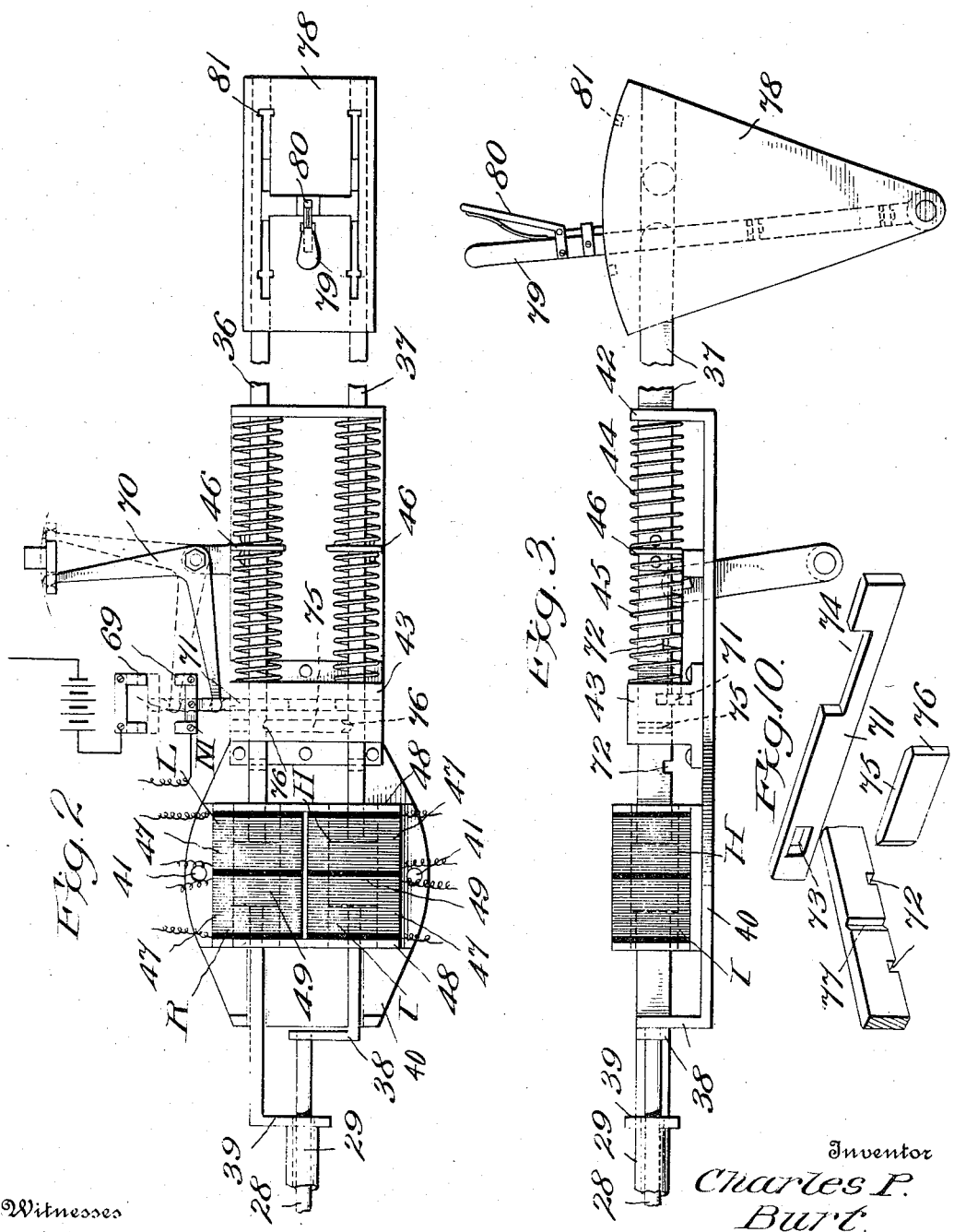

C. P. BURT.
SELECTIVE SPEED MECHANISM AND CONTROLLING DEVICE THEREFOR.
APPLICATION FILED JAN. 20, 1914.
1,133,925.
Patented Mar. 30, 1915.
4 SHEETS—SHEET 3.
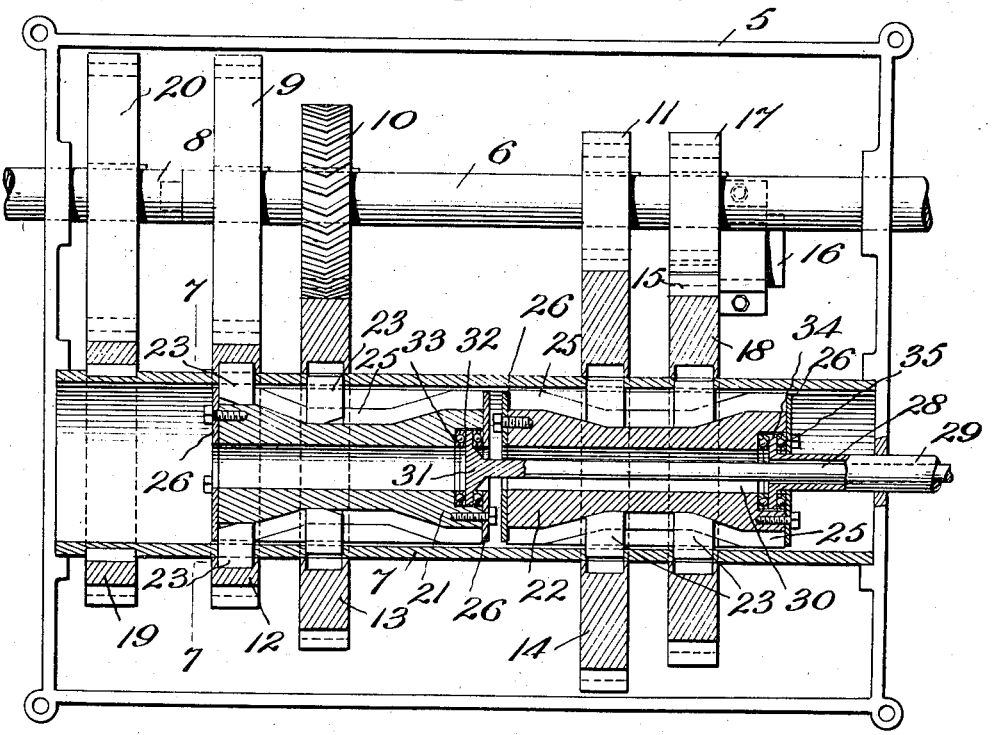
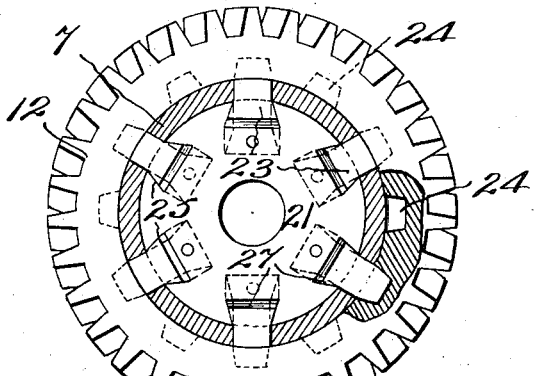
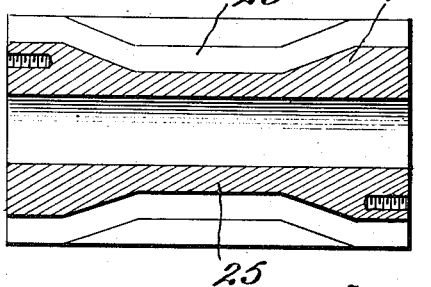
Inventor
Charles P. Burt,
By Victor J. Evans
Attorney
Witnesses
C. James Cronin
M. E. Laughlin C. P. BURT.
SELECTIVE SPEED MECHANISM AND CONTROLLING DEVICE THEREFOR.
APPLICATION FILED JAN. 20, 1914.
1,133,925.
Patented Mar. 30, 1915.
4 SHEETS—SHEET 4.
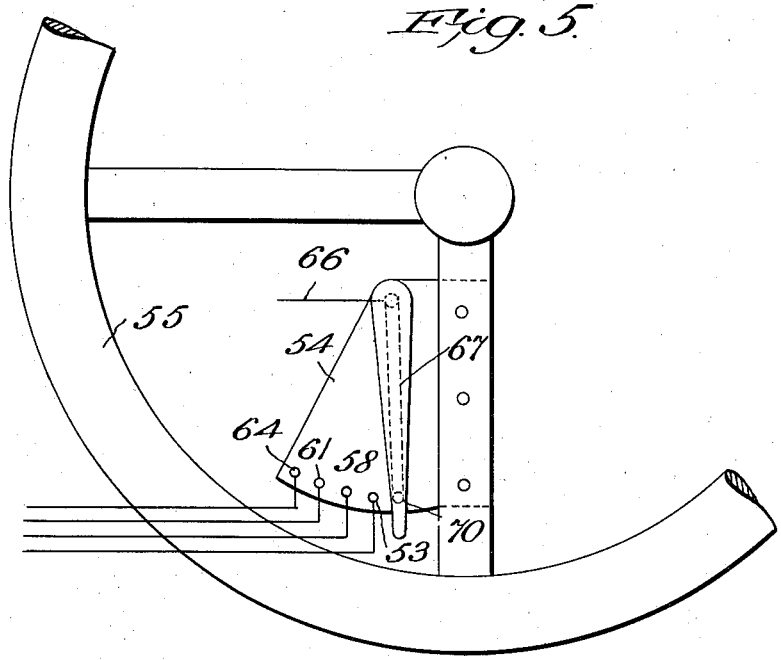

UNITED STATES PATENT OFFICE.

CHARLES P. BURT, OF EAST ORANGE, NEW JERSEY.

SELECTIVE SPEED MECHANISM AND CONTROLLING DEVICE THEREFOR.

1,133,925.   Specification of Letters Patent.   Patented Mar. 30, 1915.

Application filed January 20, 1914. Serial No. 813,289.

*To all whom it may concern:*

Be it known that I, CHARLES P. BURT, a citizen of the United States, residing at East Orange, in the county of Essex and State of New Jersey, have invented new and useful Improvements in Selective Speed Mechanism and Controlling Devices Therefor, of which the following is a specification.

The general object of the invention is to improve the construction of the type of change speed mechanisms and the selective devices therefor, which are now used in connection with motor vehicles. The points of improvement reside more particularly in the effecting of operative connection between the fast and loose gears of the change speed mechanism and in arranging and in constructing the selective mechanism to be controlled by the main clutch mechanism and one by the other, so that no variation in speed may be had with the change speed mechanism without having first released the main clutch mechanism and restored the elements of the change speed mechanism to their neutral or inoperative positions.

Other objects will appear and be better understood from that embodiment of my invention of which the following is a specification, reference being had to the accompanying drawings forming part hereof, in which:—

Figure 1 is a detail contracted plan of the invention. Fig. 2 is an enlarged detail contracted plan of the selective mechanism for the change speed mechanism. Fig. 3 is a detail side elevation of Fig. 2. Fig. 4 is an enlarged detail plan of the change speed mechanism. Fig. 5 is a diagrammatic view of the controlling switch for the electrically controlled operating device. Fig. 6 is a diagrammatic view of the several circuits of the electrically controlled operating devices for the change speed mechanism. Fig. 7 is a detail vertical cross section of the driven shaft showing the clutch device in front elevation. Fig. 8 is a detail longitudinal section of one part of the clutch mechanism. Fig. 9 is a detail perspective of another part of the said clutch mechanism. Fig. 10 is a detail perspective of the parts of the locking device. Figs. 11 to 14 inclusive are detailed views of features of the invention.

Referring to Fig. 1 A indicates generally the change speed mechanism, B the mechanical part, and C the electrical part of the change speed operating device.

5 indicates the casing which contains the change speed mechanism and also the mechanism which transmits motion from the motor (not shown) to the driving axle (not shown). This casing is suitably adapted for connection to any desirable part of the vehicle and may be of any preferred construction and formed of any suitable material. By preference the casing is rendered oil-tight so that the parts which operate therein, may run in oil or other suitable lubricant, and in constructing the casing care is given to render the operations of introducing lubricant thereinto and draining the same therefrom, comparatively easy.

6 indicates the driving shaft and 7 the driven shaft of the change speed mechanism. As shown one portion of the driving shaft 6 is directed into the casing 5 and is loosely connected with the propeller shaft 8, a portion of which is directed into the other end of the casing 5. It will be understood that the driving shaft 6 is connected to the motor (not shown) while the propeller shaft 8 is suitably connected to the driving axle (not shown). The driven shaft 7 is wholly arranged within the casing 5 and is hollow or tubular.

Fastened to the driving shaft 6 are the gear wheels 9, 10, and 11, which, by their meshing with the gear wheels 12, 13 and 14 loosely mounted on the driven shaft 7, respectively effect the production of what is commonly termed the high, intermediate and low speeds.

15 indicates the reversing gear which is secured to a shaft 16 and which meshes with a gear 17 fast upon the driving shaft 6 and a gear wheel 18 loose upon the driven shaft 7.

19 and 20 indicate the transmission gears the former of these being fastened to the driven shaft 7 and the latter fastened to the propeller shaft 8.

The several gears previously indicated are preferably of the herring-bone type and are adopted for preventing longitudinal displacement of the loose gears on the driven shaft. It will be understood however, that other well-known types of gears may be substituted for the gears shown if found desirable.

The means for effecting operative connection or the locking together of any of the gear wheels 12, 13, 14 and 18 with the driven shaft 7, comprises a clutch element herein shown in the form of a pair of barrel sections 21 and 22 arranged end to end and slidably mounted in the tubular driven shaft 7, and having associated therewith a plurality of dogs 23 which coöperate with sockets 24 in the gear wheels on the driven shaft 7.

Each of the barrel members has a plurality of longitudinal slots or cavities, the number herein shown being six. These cavities are herein indicated by 25 and are regularly spaced about the circumference of the drum and are deeper at the middle than at either end, and each has the middle portion of its bottom surface parallel with the axis, which middle portion at its opposite ends, joins sloping portions, which sloping portions join surfaces parallel with the middle portion but disposed beyond the plane thereof and arranged at the opposite ends of the said member.

The dogs 23 are disposed in the cavities 25, the said dogs being loosely mounted in the cavities with their outer ends projecting beyond the cavities and arranged so as to move radially of the barrel. The dogs are set in alinement with slots cut in the tubular shaft 7 and in alinement with the sockets 24 in the gear wheels on the driven shaft 7. Plates 26—26 suitably fastened to the opposite ends of the barrels 21 and 22 are arranged so as to abut the dogs upon the proper positioning of any set of these in the sockets of either companion wheel and thus function to prevent any displacement of the dogs from the barrel members and in a sense to limit the throw of longitudinal movement of the said barrel members.

Referring now to the drawings it will be observed that the cavities are contracted along the outer portions of their side walls while the lower portions of the dogs are flared as indicated by 27. Since the dogs project into the slots in the driven shaft 7, it is evident that the dogs and the barrels must rotate as a unit with the said shaft. The fact that the teeth project into the slots in the tubular shaft, prevents longitudinal movement of the teeth when the barrels are slid longitudinally of the shaft 7. Now by virtue of the construction of the cavities and the dogs the sloping surfaces of the bottoms of the cavities operate to cam the dogs out through the slots in the shaft and into the sockets of the wheels on the said shaft 7, that is, when the said barrels are moved in one direction from the neutral and upon restoring the said barrels to their neutral positions the side walls of the said cavities operate as a dove-tail to retract or withdraw the dogs. When the barrels are in neutral position the ends of the dogs are clear of the sockets in the gear wheels on the driven shaft 7, so that whatever motion there may be had on the part of the drive shaft 6 will not be transmitted to the driven shaft.

When each of the barrels is arranged to be moved independently of the other and when one barrel is arranged to operate the dogs for the high and intermediate and the other barrel for the low and reverse and the length of each cavity in each barrel is so proportioned to the thickness of the dogs therein, as to effect the projecting and retracting of the said dogs successively upon one reciprocation of the barrel, clearly then, each set of dogs may be directed into engagement with its companion gear wheel without effecting corresponding connection between the other sets and their respective gear wheels, all of which is shown in Fig. 4 of the drawings. It will be understood, however, that this simply illustrates an ideal arrangement and many obvious changes and especially with respect to the number of barrels employed, may be made without departing from the spirit of the invention.

The selective mechanism includes a rod 28 and a rod 29. The rod 28 telescopes into the rod 29 and both rods are directed through an opening in the forward end of the casing 5 in axial alinement with the barrels 21 and 22. The rod 28 passes through the axial bore 30 of the inner barrel 22 and its inner end is surmounted with a head 31 which is arranged in a counter-bore 32 in the forward end of the barrel 21 the said head being loosely mounted in the counter-bore 32 where a ball bearing 33 is provided to admit of the easy turning of the barrel 21 on the head 32. The inner end of the rod 29 is provided with a circular head in the form of a flange 34 which is loosely fitted in a counter-bore in the forward end of the barrel 22 and a ball bearing 35 is provided in this counter-bore to facilitate the turning of the barrel 22 on the head 34. In addition to the rods 28 and 29 the said operating mechanism includes the bars 36 and 37. These bars are by preference made non-cylindrical in cross section and in the embodiment shown are disposed horizontally and in parallelism, their rear end portions being inturned as indicated by 38 and 39, such inturned portions 38 and 39 being respectively connected to the rods 28 and 29, as shown in Figs. 1 to 3 inclusive, where it will be observed that the forward end of the rod 28 passes loosely through an opening in the inturned part 39 of the bar 36 in effecting the connection between the said rod 28 and the bar 37. Substantially midway of the ends of the bars 36 and 37 there is disposed a table 40 which is fastened to any suitable part of the vehicle preferably by means of bolts or their equivalents which pass through openings 41—41. The forward end of this table is upturned as indicated by 42 and has openings which loosely receive the bars 36 and 37. This upstanding portion forms an abutment and a second abutment in the form of a casing 43 is provided intermediate of the ends of the table and has openings which loosely receive the bars 36 and 37. Arranged on each of the bars 36 and 37 and disposed between the abutment 42 and the casing 43, are opposed compression springs 44 and 45, the adjacent ends of which bear on rings 46 carried by the bars 36 and 37. In length these springs are so proportioned as to bear on the rings 46 and the abutment 42 and casing 43 when the parts of the selective speed mechanism are at neutral. In such position the springs are relaxed but when either bar is moved in one direction one of the springs carried thereby will be compressed, and when moved in the other direction the other spring carried by the bar will be compressed. In other words, the springs carried by each bar will be alternately compressed when the bars which carries them is reciprocated.

As shown in Figs. 1 to 4 inclusive, the bars 36 and 37 may be operated either electrically or mechanically. For effecting the operation of said bars electrically a pair of solenoids 47—47 is provided for each bar. These solenoids surround the said bars and the units in each pair are opposed one to the other and all the solenoids are supported in a yoke 48 arranged on the table 40. The solenoids on each bar have a common core 49 which core is fastened to the bar and is of a length equal approximately to one-half the combined lengths of the solenoid coils with which it is associated. In positioning the solenoids care is given to dispose the cores on the bars so that when the elements of the selective speed mechanism are in neutral position, equal portions of each core will extend into the coils with which it is associated. Obviously, with this arrangement the energizing of any solenoid will effect the movement in one direction of the bar surrounded thereby and the compression of one of the springs surrounded by the said bar, which spring will, upon the deënergizing of the said solenoid, restore the core thereof to its normal position as hereinbefore stated, so that when the solenoid opposed to the first-named solenoid, is energized, the bar will be moved a second time but in the opposite direction, whereupon the other of the springs carried by the bar will be compressed and function to restore the solenoid core to its normal position when the second named solenoid is deënergized.

From the foregoing it will have been observed that where a separate circuit is provided for each solenoid so that any solenoid may be energized independently of the others, the obtaining of the desired speed or movement of the vehicle in a reverse direction may be had by closing the circuit through the proper solenoid.

Referring now to Figs. 1 to 3 inclusive, it will be observed that high speed is obtained by the moving of the barrel 21 to the right from neutral position and until the dogs 23 are projected into the sockets 24 of the wheel 12, in which position the parts will be arranged as shown in Fig. 4. Now with the parts arranged as just stated, intermediate speed is obtained by the moving of the barrel 21 to the left in Fig. 4 and until the second set of dogs 23 are projected into the sockets 24 of the gear wheel 13.

Again referring to Fig. 4 it will be observed that the moving of the barrel 22 to the right in the said figure and until one of the sets of dogs associated with the said barrel are projected into the sockets of the gear wheel 14, effects the obtaining of low speed, while the moving of the said barrel 22 to the left and until the other set of dogs are in engagement with the sockets in the wheel 18, reverses the direction of movement had by the vehicle. Since the rod 28 which is connected to the bar 38, operates the barrel 21 to bring to high and intermediate speeds, the solenoids which operate this rod will subsequently be referred to as the high and intermediate speed solenoids. These elements are shown in the lower parts of Figs. 1, 2 and 6 and are respectively indicated by H and I. The solenoids which effect the operation of the tubular rod 29, the bar 39 and the barrel 22 which brings about low speed and reverse, will hereinafter be referred to as the low speed and reversing solenoids. These elements are shown in the upper part of Figs. 1, 2 and 6 and are respectively indicated by L and R.

Fig. 6 shows diagrammatically the arrangement of the solenoid circuits. The circuit of the high speed solenoid extends by the wires 50 and 51, which are connected to the opposite ends of the solenoid coil, the wire 51 being connected to a common return 52 and the wire 50 to a contact point 53 suitably arranged as shown in Fig. 5 in a casing 54 from which it is insulated, the said casing 54 being suitably arranged on the steering wheel 55. The circuit of the intermediate speed solenoid extends by the wires 56 and 57, these wires being connected to the opposite ends of the core of the solenoid and the former connected to the return wire 52 and the latter to a contact 58 adjacent to the contact 53 and insulated therefrom and from the casing 54. 59 and 60 indicate the circuit wires of the low speed solenoid; the latter of these wires is connected to one terminal of the coil and to the return 52, and the former to the other terminal of the coil and to a contact 61 adjacent to the contact 58 and insulated from the said contact and from the casing 54. 62 and 63 indicate the circuit wires of the reversing solenoid. These wires are connected at one end to the terminals of the coil of the said solenoid and are connected at their opposite ends to the return wire 52 and to a contact 64 adjacent to the contact 61 and insulated therefrom and from the casing 54. 65 indicates a suitable source of electric energy, such as a battery of cells suitably arranged on the vehicle (not shown). One terminal of this battery is connected by a wire 66 to a switch lever 67 mounted in the casing 54 and arranged so as to make contact with any of the points 53, 58, 61 and 64. 68 indicates a line which connects the other terminal of the battery with the return wire 52, and 69 indicates a master switch for controlling this line 68. Obviously from the foregoing, when the switch lever 67 is moved from the neutral contact point 70 onto the adjacent contact 53, for instance, and upon the closing of the master switch 69 the circuit will be completed through the high speed solenoid, whereupon the movement of the armature of that solenoid to the right in Fig. 2, will effect the positioning of the parts as shown in Fig. 4. And a like effect in point of movement of one of the barrels 21 and 22 will be had when the said switch is moved onto any other of the contacts. As previously indicated the completing of any solenoid circuit depends on the closing of the master switch 69, I have found it desirable to construct and arrange this switch to coöperate with a lock so that the changing from one speed to another may not be had until all parts of the speed changing mechanism are moved into neutral position.

Referring now to Fig. 2 the movable part M of the master switch 69 is connected to one arm of a bell crank 70 which is suitably connected to one of the operating parts of the ordinary main clutch mechanism of the vehicle. Now when the said main clutch is thrown out the lever 70 will occupy the position shown by dotted lines in Fig. 2 and will occupy the position shown by full lines in said figure when the main clutch is active or thrown in. Referring now to Fig. 2 the movable part M of the master switch 69 is connected to a main lock bolt 71 which passes through the casing 43 previously mentioned and through alining slots or notches 72 in the lower edges of the bars 36 and 37. The main lock bolt 71 has an opening 73 which loosely receives one end of the bell crank 70 and is provided in its upper side with a recess or notch 74. In length this recess 74 is so proportioned that it will occupy a position between the bars 36 and 37 when the master switch is open as shown in Fig. 2, and when so positioned one portion of the lock bolt beyond one end of the recess will be disposed in one of the notches 72 of the bar 37, while another portion of the lock bolt beyond the other end of the recess will be disposed in a notch in the bar 36. Manifestly, when the parts are so arranged the bars 38 and 39 with the parts connected thereto, will be rendered immovable, but upon closing the switch to the position shown by dotted lines in Fig. 2, the free end portion of the lock bolt 71 will be retracted from the notch in the bar 37 and the recess 74 of the said bolt will be moved into alinement with the bar 36, whereupon either of the said bars may be operated.

Referring now to Figs. 2 and 3 it will be observed that each of the bars 36—37 has three of the notches 72 in its under-side. These notches are disposed so that when the lock bolt 71 is entered into the intermediate notches the parts of the selective speed mechanism will be at neutral, and the notches in each bar are arranged with such relation to each other that a movement on the part of that bar for a distance equal to that between adjacent notches, will effect the desired adjustment of the change speed mechanism and bring the desired notch on that bar into alinement with the main lock bolt 71.

In addition to the main lock there is also provided a supplemental lock which operates automatically upon the selecting of any speed to positively lock the other parts of the speed changing mechanism against operation; or in other words, to hold them neutral until the parts previously adjusted to obtain the desired speed, have been restored to neutral position. In the embodiment shown this supplemental lock comprises a bolt 75 slidingly mounted in a suitable guide in the casing 43 and positioned between the bars 36 and 37. In length this bolt is a trifle greater than the distance between the adjacent lateral faces of the bars 36 and 37 and each of its ends is tapered as indicated by 76. In order that the bolt 75 may be accommodated between the bars 36 and 37 these elements are provided on their opposed lateral faces with V-shaped notches 77 as clearly shown in the drawings.

Now when the parts of the change speed mechanism are in the neutral the notches 77 will be in alinement as shown in Fig. 2, in which position one end of the supplemental lock bolt 75, by virtue of its length, will be out of the path of movement of one of the bars if its opposite end be nested in the notch in the other bar. When the bars are neutral the disposition of the ends of the supplemental lock bolt with respect to either bar, will be immaterial, because of the fact that the ends 76 are tapered or beveled and hence movement on the part of either bar will simply have the effect of moving the supplemental lock bolt laterally if one end of the said lock bolt be arranged in the notch of that bar at the time of its initial movement.

Again referring to Fig. 2 it will be observed that the length of the supplemental lock bolt is such that it corresponds to the distance between the bottom of the notch 77 in one bar and the interrupted portion of the adjacent lateral surface in the other bar. As a consequence of this one of the bars 36—37 upon moving in either direction and for instance, from the position shown in Fig. 2, will operate to slide the supplemental lock bolt 75 into the notch in the opposite bar. Whereupon, the interrupted lateral surface of the other bar will bear upon the adjacent end of the bolt 75 and operate to hold this bar against movement in either direction. Thus it will be seen that when the notches 77 are out of alinement the bar operated to adjust the change speed mechanism, will hold, through the bolt 75, the other bar against movement in either direction.

The means for effecting the operation of the selective mechanism mechanically, comprises a quadrant 78 which is suitably attached to any desired portion of the vehicle and in which there is fulcrumed one end of an operating lever 79. The lever is provided with the usual latch 80 which cooperates with the notches 81 in the upper end of the quadrant 78. The lever 79 is so mounted in the quadrant and the quadrant is so constructed as to permit of the lever being moved into engagement with either of the bars 36 and 37 and moved in the required direction to effect the desired operation of the selective mechanism.

From the foregoing it will have been observed that the lock mechanism is common to the electrical and the mechanical operating devices and that either of these devices may be used without the presence of the other.

The bell crank 70, the main lock bolt 71 and the master switch 69 are so proportioned that the first movement of the clutch pedal serves to disengage the main clutch; a further motion of the clutch pedal effects the closing of the master switch 69 and the withdrawal of the main lock bolt 71 and releases the bars 36 and 37.

It will be seen that if the parts are so positioned that gear wheel 12 is secured to the driven shaft, as in Fig. 4, the rod 37 will have been moved to the right and the main lock bolt will be in the left notch 72 in the rod 37. Now if there be no change in the position of the control switch lever 67, and the clutch pedal be depressed, the main clutch will be disengaged, but before the main lock bolt 71 is withdrawn from the notch 72 the master switch 69 will close the circuit to the solenoid coil H and the wheel 12 will remain connected to the driven shaft even though the main lock bolt be entirely withdrawn. On the other hand, if the control switch lever is moved to the contact 61 and the clutch pedal be depressed, the main clutch will be disengaged, the master switch will then be closed and current will flow through the solenoid coil L. This coil will then exert an effort to move the rod 36 to the right, but the movement of 36 will be prevented by the lock 75. As soon as the main lock is withdrawn, by further movement of the clutch pedal, the spring 44 will cause the rod 37 to move to the left and when 37 has reached the neutral position, the lock 75 will slide over and allow the movement of the rod 36. The rod 36 under the impulse of the solenoid L will move to the right and effect the connection of the wheel 14 to the driven shaft, thus connecting the low speed gear.

What is claimed as new is:

1. In combination with a change speed mechanism a clutch, means for operating the clutch, an electric selective device for operating the change speed mechanism, locking means for the selective device, a circuit closer adapted when closed to effect the movement of the selective device from a normal to an abnormal position, and means operatively connecting the clutch operating means with the locking means and the circuit closer whereby the locking means is moved to release the selective device and whereby the circuit closer is closed, subsequent to the release of the clutch, by the clutch operating means.

2. In combination with a change speed mechanism, a clutch, means for operating the clutch, an electric selective device for operating the change speed mechanism, locking means for the selective device, a circuit closer adapted when closed to effect the movement of the selective device from a normal to an abnormal position, and means operatively connecting the clutch operating means with the locking means and the circuit closer whereby the initial movement of the clutch operating means renders the clutch inactive, the intermediate movement of the clutch operating means closes the circuit closer, and the final movement of the clutch operating means releases the locking means from the selective device.

3. In combination with a change speed mechanism, a clutch, means for operating the clutch, an electric selective device for operating the change speed mechanism, locking means for the selective device, a circuit closer adapted when closed to effect the movement of the selective device from a normal to an abnormal position, and means operatively connecting the clutch operating means with the locking means and the circuit closer whereby the initial movement of the clutch operating means renders the clutch inactive, the intermediate movement of the clutch operating means closes the circuit and the final movement of the clutch operating means releases the locking means from the selective device, and the parts may return to normal positions in an order inverse to that named for moving them to abnormal positions.

4. In combination with a change speed mechanism, a clutch, means for operating the clutch, an electric selective device for operating the change speed mechanism, means for locking the selective device in normal and abnormal positions, a circuit closer adapted when closed to effect the movement of the selective device from a normal to an abnormal position, and means operatively connecting the clutch operating means with the locking means and the circuit closer.

5. In combination, a change speed mechanism, electrically controlled devices for operating the said change speed mechanism, said devices including a plurality of bars, a manually operated switch for controlling a supply of current from a source of electric energy to the electrically operated devices, and a locking device connected to the said switch and operable with the same and arranged so as to effect the locking of the said bars upon the opening of the switch and the unlocking of the said bars upon the closing of the switch.

6. In combination with a change speed mechanism, a clutch, means for operating the change speed mechanism, and a lock connected with the clutch and arranged to be moved therewith to lock the parts of the change speed operating mechanism one to the other when the clutch is rendered active, and further arranged to be moved to effect the unlocking of the parts of the said operating mechanism when the clutch is rendered inactive.

7. In combination with a change speed mechanism, a clutch, means for operating the change speed mechanism, a lock connected with the clutch and arranged to be moved therewith to lock the parts of the change speed operating mechanism one to the other when the clutch is rendered active, and further arranged to be moved to effect the unlocking of the parts of the said operating mechanism when the clutch is rendered inactive, and a supplemental lock arranged to be operated by one of the parts of the change speed operating mechanism to lock another part of said mechanism during the adjustment of the first mentioned part thereof.

8. In combination with a change speed mechanism, a clutch, means for operating the change speed mechanism including a plurality of bars mounted for movement in the direction of their length, and a lock disposed substantially at right angles to the bars and in operative relation thereto, said lock being connected with the clutch and movable therewith and arranged to lock the bars one to the other when the clutch is rendered active, and further arranged to unlock the said bars when the clutch is rendered inactive.

9. In combination with a change speed mechanism, a clutch, means for operating the change speed mechanism including longitudinally movable bars, a lock arranged to lock said bars in a determined neutral position and in positions on either side of the said neutral position, a connection between the clutch and the lock for operating the lock to lock the bars when the clutch is rendered active, and further arranged to unlock the bars when the clutch is rendered inactive, and means including opposed springs arranged so as to be potentialized by the movement of the bars in either direction whereby to effect automatically the restoring of the bars to neutral position upon the unlocking thereof.

In testimony whereof I affix my signature in presence of two witnesses.

CHARLES P. BURT.

Witnesses:
JOHN A. DONEGLE,
GEO. A. BYRNE.